United States Patent [19]

Armitage et al.

[11] Patent Number: 4,826,553
[45] Date of Patent: May 2, 1989

[54] METHOD FOR REPLICATING AN OPTICAL ELEMENT

[75] Inventors: David Armitage, Los Altos; John I. Thackara, Sunnyvale, both of Calif.

[73] Assignee: The United States of America as represented by the Secretary of the Air Force, Washington, D.C.

[21] Appl. No.: 63,378

[22] Filed: Jun. 18, 1987

[51] Int. Cl.4 .......................... B44C 1/16; B32B 31/00; B23P 17/00

[52] U.S. Cl. .................................... 156/233; 156/234; 156/239; 156/249; 156/330; 156/344; 29/426.1

[58] Field of Search ............... 156/344, 584, 249, 230, 156/235, 239, 241, 232, 233, 234, 239, 246, 541, 330; 264/1.7, 318; 350/356, 320; 29/423, 424, 426.1, 426.2

[56] References Cited

U.S. PATENT DOCUMENTS

| | | | |
|---|---|---|---|
| 3,317,640 | 5/1967 | Jones | 350/320 |
| 3,867,503 | 2/1975 | Shoe | 264/318 |
| 4,061,518 | 12/1977 | Burroughs et al. | 156/241 |
| 4,122,595 | 10/1978 | Wood et al. | 29/424 |
| 4,255,216 | 3/1981 | Conant et al. | 156/584 |
| 4,297,778 | 11/1981 | Rumberger et al. | 156/344 |
| 4,312,695 | 1/1982 | Willis | 156/344 |
| 4,422,893 | 12/1983 | Duchateau et al. | 156/232 |
| 4,543,673 | 10/1985 | Drake et al. | 264/1.7 |
| 4,619,501 | 10/1986 | Armitage | 350/356 |
| 4,664,739 | 5/1987 | Aurichio | 156/249 |

Primary Examiner—Michael W. Ball
Assistant Examiner—Louis Falasco
Attorney, Agent, or Firm—Richard J. Donahue; Donald J. Singer

[57] ABSTRACT

A method for transferring a dielectric mirror prepared on an optical flat replication substrate to a utilization device having a nonflat surface. In order to separate the replication substrate from the mirror after the mirror has been cemented to the device at room temperature and the cement allowed to cure over an extended time period, the composite assembly is inserted into a fixture which provides a buckling force to the center of the replication substrate to cause the replication substrate to be peeled from the mirror.

1 Claim, 1 Drawing Sheet

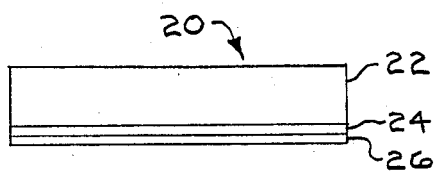
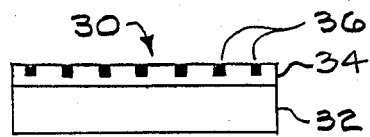
FIG.1   FIG.2
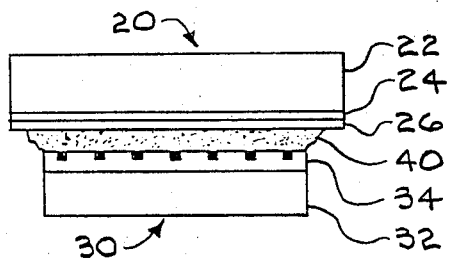
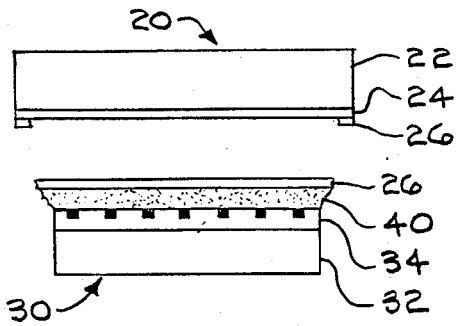
FIG.3   FIG.4
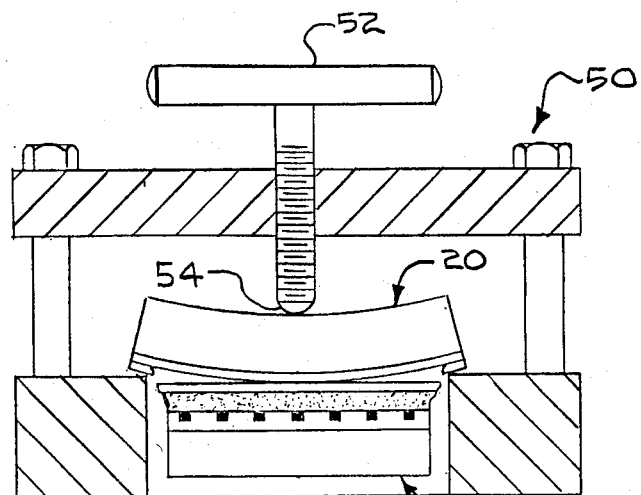
FIG.5

METHOD FOR REPLICATING AN OPTICAL ELEMENT

STATEMENT OF GOVERNMENT INTEREST

The invention described herein may be manufactured and used by or for the Government for governmental purposes without the payment of any royalty thereon.

BACKGROUND OF THE INVENTION

This invention relates in general to a method for replicating an optical element. More specifically, it concerns a method for transferring a dielectric film mirror formed on a high quality optical flat to the non-flat surface of an optical or electrooptical device, such as for example, to the silicon surface of a spatial light modulator.

A presently used method for mirror replication involves the initial step of depositing a release agent on a surface whose optical qualities are to be replicated, such as on the surface of a high quality optical flat. The release agent may be a liquid coating which is allowed to cure to a dry film of about one hundred angstroms thickness. A dielectric mirror is then formed on top of the release agent by vacuum evaporation. An optical device which requires such a dielectric mirror, but whose surface lacks the flatness properties of the replication substrate, is cemented to the prepared mirror and the cement is cured at a high temperature, such as at one hundred degrees centigrade. A subsequent abrupt exposure of the cemented assembly to room temperature provides forces of differential contraction which separate the mirror from the surface of the replication substrate. The result is a transferred mirror with an optical quality approaching that of the replicating substrate.

It has been found however, that in some applications, such as when bonding the replicated mirror to a thin silicon substrate, the heat-cure and thermal separation method described above places substantial stress on the bond and can produce distortions or even cracks in the mirror. Because of this problem, it is desirable to be able to perform the replication transfer process at room temperature, where the slow room-temperature cure of a two-component epoxy cement would minimize the aforementioned stress condition. The problem then remaining to be solved, however, is how to separate the mirror from the original substrate.

OBJECTS AND SUMMARY OF THE INVENTION

It is therefore the primary object of the present invention to provide an improved method for transferring a mirror formed on an optical flat replication substrate to the surface of an optical or electrooptical device, such as a spatial light modulator.

It is a further object of the present invention to provide a method for replicating an optical mirror by transferring and adhering the mirror to a silicon substrate without creating thermally induced distortions in the mirror.

In accordance with the method of the present invention, an optical flat substrate having a dielectric film mirror formed thereon is cemented to an optical or electrooptical device, and the cement is allowed to fully cure at room temperature over an extended time period. The mirror is then peeled off of the original substrate by placing the composite assembly into a fixture which applies a buckling force to the center of the substrate.

The foregoing and other objects, advantages and features of the present invention will become apparent from the following detailed description of the preferred embodiment thereof, as illustrated in the accompanying drawings.

BRIEF DESCRIPTION OF THE DRAWINGS

FIG. 1 is a side view of an optical replication device having a dielectric film mirror formed thereon.

FIG. 2 is a side view of a portion of a spatial light modulator electrooptical device.

FIG. 3 is a side view of the optical flat substrate and dielectric mirror of FIG. 1 cemented to the spatial light modulator device of FIG. 2.

FIG. 4 is a side view of the optical flat substrate and the spatial light modulator after they have been separated and with the dielectric mirror now transferred to the spatial light modulator.

FIG. 5 is a sectioned side view of a fixture for buckling and thereby separating the optical flat substrate from the joined mirror and spatial light modulator.

DETAILED DESCRIPTION OF THE INVENTION

It should be clarified at the outset of this description that the optical devices depicted in the various figures of the drawings have not been drawn to scale especially in view of the vast differences in the thicknesses of their layered components. Representative dimensions are provided herein, however, to facilitate an understanding of the invention.

Additional information concerning the particular type of spatial light modulator device which is discussed herein, and which may now be partially constructed by the method claimed herein, can be found in U.S. Pat. No. 4,619,501 issued on Oct. 28, 1986, and incorporated herein by reference.

Referring now to the drawings, FIG. 1 depicts a side view of an optical replication device 20 comprising an optically flat substrate 22 whose bottom surface is to be reproduced. Substrate 22 may be a Pyrex disk having a diameter of 75 millimeters and a thickness of 12.7 millimeters. A release agent 24 is coated on the surface of substrate 22 to be replicated. Release agent 24 may be a liquid coating, such as FREKOTE, which is cured to a dry film of about one hundred angstroms thickness. A dielectric mirror 26 is then deposited on top of release agent 24 by vacuum evaporation techniques. Mirror 26 may itself comprise alternating layers of titanium dioxide and silicon oxide to an overall thickness of about one micron.

FIG. 2 depicts a part of a spatial light modulator 30 having an optical glass substrate 32 of approximately 12 millimeters thickness and fifty millimeters diameter. A silicon layer 34 having a microgroove lattice structure 36 is formed on device substrate 32. Silicon layer 34 has a thickness in the order of a tenth of a millimeter.

As mentioned earlier herein, it is desired to transfer mirror 26 from optical flat substrate 22 and affix it to the silicon layer 34 of spatial light modulator 30. As shown in FIG. 3, an initial step is to bond mirror 26 to silicon layer 34 with a cement 40. In prior methods, however, the cement used was a cement which was cured at an elevated temperature, in the order of one hundred degrees centigrade, and then abruptly exposed to room temperature to provide differential contraction forces which separated the mirror from the surface of the replication substrate.

In order to avoid the aforementioned concomitant degradation of the mirror quality, the present method departs from the prior art by bonding mirror 26 to silicon layer 32 with a two-component epoxy cement 40 which is cured at room temperature, between eighteen and twenty eight degrees centigrade, over a period of about three days, which minimizes shrinkage of the cement. The epoxy cement may be EPO-TEK 301-2.

In order to separate optical replication device 20 from spatial light modulator device 30, and have dielectric mirror 26 remain affixed to silicon layer 34, as shown in FIG. 4 of the drawings, a fixture 50 such as that depicted in FIG. 5 is used to apply a buckling force via a turnscrew 52 having a nylon tip 54 to the center of the replication device 20. The buckling effect provided by fixture 50, which has been greatly exaggerated in FIG. 5 for the purpose of clarity, peels off replication device 20 leaving the mirror 26 cemented to the silicon layer 32 of spatial light modulator 30. The excess cement and the edge of mirror 26 which overhang the sides of the spatial light modulator can then be trimmed off, if desired.

Although the invention has been described with reference to a particular embodiment, it will be understood to those skilled in the art that the invention is capable of a variety of alternative embodiments that come within the spirit and scope of the appended claims.

What is claimed is:

1. A method for transferring an optical element formed over a release agent coating on a replication device to a utilization device comprising the steps of:

providing an optical element over a release coated replication device;

cementing an exposed surface of said optical element to an exposed surface of said utilization device by applying a two-part epoxy cement between the surface of the optical element and the utilization device;

curing said cement at a temperature between eighteen and twenty eight degrees centigrade over a time period of at least three days to bond the optical element to the utilization device;

and separating said optical element bonded to the utilization device from said replication device by providing a buckling force to the center of said replication device to peel said replication device from said optical element cemented to the utilization device.

* * * * *